United States Patent
Tsuyuki et al.

(10) Patent No.: US 6,685,123 B2
(45) Date of Patent: Feb. 3, 2004

(54) MAGNETIC TAPE CARTRIDGE

(75) Inventors: Seiji Tsuyuki, Kanagawa-ken (JP); Hideaki Shiga, Kanagawa-ken (JP); Daisuke Takahashi, Kanagawa-ken (JP); Yusuke Ishihara, Kanagawa-ken (JP)

(73) Assignee: Fuji Photo Film Co., Ltd., Kanagawa-Ken (JP)

(*) Notice: Subject to any disclaimer, the term of this patent is extended or adjusted under 35 U.S.C. 154(b) by 0 days.

(21) Appl. No.: 10/208,031

(22) Filed: Jul. 31, 2002

(65) Prior Publication Data

US 2002/0185563 A1 Dec. 12, 2002

Related U.S. Application Data

(62) Division of application No. 09/825,943, filed on Apr. 5, 2001, now Pat. No. 6,499,686.

(30) Foreign Application Priority Data

Apr. 5, 2000 (JP) .......................... 2000/103431

(51) Int. Cl.⁷ .......................... G11B 23/107
(52) U.S. Cl. .......................... 242/348; 360/132
(58) Field of Search .......................... 242/338.1, 343, 242/348; 360/132

(56) References Cited

FOREIGN PATENT DOCUMENTS

| EP | 0 926 676 A | 6/1999 |
|---|---|---|
| EP | 1 054 403 A | 11/2000 |
| EP | 1 098 320 A | 5/2001 |
| EP | 1 098 321 A | 5/2001 |
| JP | 11-23835 | 1/1999 |
| JP | 11-232828 | 8/1999 |

OTHER PUBLICATIONS

Patent Abstracts of Japan, vol. 1999, No. 13, Nov. 30, 1999 & JP 11 238352 A (Hitachi Maxell Ltd), Aug. 31, 1999 *abstract.
Patent Abstracts of Japan, vol. 1999, No. 13, Nov. 30, 1999 & JP 11 238351 A (Hitachi Maxell Ltd), Aug. 31, 1999 *abstract.
Patent Abstracts of Japan, vol. 2000, No. 02, Feb. 29, 2000 & JP 11 306725 A (Fuji Photo Film Co Ltd), Nov. 5, 1999 *abstract.
Patent Abstracts of Japan, vol. 2000, No. 05, Sep. 14, 2000 & JP 2000 048525 A (Fuji Photo Film Co Ltd), Feb. 18, 2000 *abstract.
Patent Abstracts of Japan, vol. 1999, No. 14, Dec. 22, 1999 & JP 11 250618 A (Fuji Photo Film Co Ltd), Sep. 17, 1999 *abstract.

*Primary Examiner*—John Q. Nguyen
(74) *Attorney, Agent, or Firm*—Sughrue Mion, PLLC

(57) ABSTRACT

A magnetic tape cartridge including a reel-rotation restraining member which restricts rotation of a reel when not used and allows the rotation of the reel when used. The reel-rotation restraining member has a restraining member, an urging member, and an unlocking member. The restraining member has a restraining gear which meshes with a locking tooth portion, and the restraining member is supported by a support portion of the cartridge case. In the magnetic tape cartridge, the following relationship is met:

$$b \leq (2 \times a \times c)/d$$

where "a" represents the length of engagement between the restraining member in an unlocked state and the support portion, "b" represents the clearance between the restraining member and the support portion, "c" represents the space between the tooth of the restraining gear and the locking tooth portion, and "d" represents the outside diameter of the restraining gear.

2 Claims, 5 Drawing Sheets

MAGNETIC TAPE CARTRIDGE

This is a divisional of application Ser. No. 09/825,943 filed Apr. 5, 2001 now U.S. Pat. No. 6,499,686; the disclosure of which is incorporated herein by reference.

BACKGROUND OF THE INVENTION

1. Field of the Invention

The present invention relates to a magnetic tape cartridge and more particularly relates, in a magnetic tape cartridge where a single reel with magnetic tape wound thereon is rotatably housed within a cartridge case, to the structure of reel-rotation restraining means which causes the reel to be in a rotation-restrained state when not being used.

2. Description of the Related Art

In the magnetic tape cartridges, which are used as storage medium to be employed in external storage units for computers, etc., there is known a type where a single tape reel with magnetic tape wound thereon is rotatably housed within a cartridge case. This magnetic tape is employed as a data archiving tape for computers, etc., and stores important information. For this reason, the magnetic tape cartridge is provided with reel-rotation restraining means for restricting rotation of the reel so that problems, such as tape jamming, etc., do not occur and that the magnetic tape is not pulled out from the cartridge case unexpectedly when not being used, such as when being archived, etc.

The reel-rotation restraining means, as disclosed in Japanese Unexamined Patent Publication No. 11 (1999)-23835, is equipped with a restraining member for restricting rotation of the reel, an urging member for urging the restraining member in a restraining direction, and an unlocking member for moving the restraining member in an unlocking direction in accordance with the chucking operation of the rotation means of the drive mechanism of a drive unit such as a recording-reproducing unit.

A locking tooth portion is formed on the reel side, while a restraining gear meshable with the locking tooth portion is provided on the side of the restraining member provided so that it cannot rotate with respect to the cartridge case. In the non-operative state, the restraining gear of the restraining member engages the locking tooth portion of the reel to restrict unexpected rotation of the reel, whereby the magnetic tape wound on the reel can be locked. On the other hand, if the magnetic tape cartridge is loaded into the drive unit, the unlocking member moves the restraining member to disengage the restraining gear of the restraining member from the locking tooth portion of the reel. In the disengaged or unlocked state, the reel is rotatable and therefore the magnetic tape can be loaded into or unloaded from the drive unit.

The above-mentioned unlocking member is equipped with a main body which abuts the above-mentioned restraining member, and leg portions which abut the rotation means of the drive mechanism of the drive unit. When the chucking operation of the rotation means is performed, the rotation means moves the unlocking member upward to disengage the retraining gear of the restraining member from the locking tooth portion of the reel.

In the case where a magnetic tape cartridge is equipped with the reel-rotation restraining means mentioned above, incidentally, the restraining member in the unlocked state is unstable because the central portion of the restraining member is supported only by the central portion of the unlocking member. On the other hand, because the reel is rotated or stopped according to loading or unloading of the magnetic tape, the force exerted on the reel is transmitted to the restraining member through the unlocking member. For this reason, the restraining member tends to tilt. If the restraining member tilts, the restraining gear thereof will contact the locking tooth portion of the reel. This produces an undesirable sound, disturbs rotation of the reel, and interferes with the operation of loading or unloading magnetic tape.

In addition, in the case where the magnetic tape slackens because of the shock produced by the magnetic tape cartridge falling when not being used, the magnetic tape cartridge cannot absorb the slack of the magnetic tape because it has only a single reel within the cartridge case. As a result, there is a fear that the magnetic tape will be damaged. Hence, in order to prevent the magnetic tape from slackening because of shock caused by the cartridge falling, the locking tooth portion of the reel and the restraining gear are constructed so that the tooth face of the locking tooth portion, which faces in the reverse winding direction (tape slackening direction), and the tooth face of the restraining gear, which abuts the tooth face of the locking tooth portion, are inclined at an angle near to 90 degrees.

However, in the case where the reel in the non-operative state is unexpectedly locked by the mesh between the restraining gear and the locking tooth portion, there are cases where the reel is freely moved by the complete mesh between the restraining gear and the locking tooth portion, depending on the phase relationship between the two in the unmeshed state. Particularly, if the tooth face of the locking tooth portion, which faces in the reverse winding direction (tape slackening direction), and the tooth face of the restraining gear, which abuts the tooth face of the locking tooth portion, are inclined at an angle near to 90 degrees in order to prevent slackness, as described above, the locking tooth portion and the restraining gear move only in the winding direction when they mesh with each other, and consequently, force is exerted on the magnetic tape in the winding direction.

In addition, in the case of a magnetic tape cartridge with magnetic tape wound on a single reel, a tape leader member is coupled with the leading end of the magnetic tape, and the tape leader member is caught by the catching member of the drive mechanism of a drive unit to pull out the magnetic tape from the cartridge case. In this construction, if the tape leader member is exposed to the case peripheral side, there is a problem that the free end will project from the cartridge case, or dust will enter the cartridge case through a tape leader opening formed in the cartridge case, when the magnetic tape cartridge is subjected to a falling shock, etc. Hence, it is disclosed in Japanese Unexamined Patent Publication No. 11 (1999)-232828 that a tape leader pin is retained inside a tape leader opening which is closed or opened by a slide door. The configuration of the tape leader member is determined mainly by specifications for the recording-reproducing unit.

Thus, in the case where the tape leader pin is coupled with the leading end of the magnetic tape, and the tape leader pin is retained within the cartridge case during the non-operative state, if the reel is moved in the winding direction and a pulling force greater than a predetermined quantity is exerted on the magnetic tape, there is a fear that the magnetic tape and the tape leader pin will be easily disengaged from each other, because the strength of the engagement of the tape leader pin with the magnetic tape is relatively low. Even when the two are not disengaged, the magnetic tape will be stretched by the aforementioned pulling force. Because of this, the magnetic recording-reproducing characteristics are degraded, or the tape leader pin is shifted out of a predetermined retaining position or tilted. Thereafter, there is a fear that the magnetic tape cannot be correctly loaded into the drive unit and therefore reliability will be reduced.

SUMMARY OF THE INVENTION

The present invention has been made in view of the above-mentioned points. Accordingly, it is a first important object of the present invention to provide a magnetic tape cartridge which is capable of preventing the contact between a restraining gear and a locking protrusion that is caused by the tilt of the restraining member.

A second important object of the invention is to provide a magnetic tape cartridge that is capable of preventing the disengagement of the magnetic tape from a tape leader pin which is caused by the magnetic tape pulled in the locked state when subjected to a falling shock, while assuring the locked state of a reel obtained in a non-operative by the restraining member of reel-rotation restraining means.

To achieve the first object of the present invention and in accordance with the present invention, there is provided a first magnetic tape cartridge comprising:

a cartridge case where a single reel with magnetic tape wound thereon is rotatably housed; and reel-rotation restraining means which, when not used, goes to a locked state to restrict rotation of the reel and, when used, goes from the locked state to an unlocked state to allow the rotation; the reel-rotation restraining means having a restraining member for restricting rotation of the reel by moving toward or away from the reel, an urging member for urging the restraining member in a restraining direction, and an unlocking member for moving the restraining member in an unlocking direction, by rotating integrally with the reel and moving according to a chucking operation of rotation means of a drive unit;

wherein the restraining member has a restraining gear which meshes with a locking tooth portion formed in the reel to restrain rotation of the reel, the restraining member being supported by a support portion of the cartridge case so that it is slidable without being rotated; and the following relationship is met:

$$b \leq (2 \times a \times c)/d$$

where "a" represents the length of engagement between the restraining member in the unlocked state and the support portion, "b" represents the clearance between the restraining member and the support portion, "c" represents the space between a tooth of the restraining gear and the locking tooth portion, and "d" represents the outside diameter of the restraining gear.

In accordance with the present invention, there is provided a second magnetic tape cartridge comprising:

a cartridge case where a single reel with magnetic tape wound thereon is rotatably housed; and reel-rotation restraining means which, when not used, goes to a locked state to restrict rotation of the reel and, when used, goes from the locked state to an unlocked state to allow the rotation; the reel-rotation restraining means having a restraining member for restricting rotation of the reel by moving toward or away from the reel, an urging member for urging the restraining member in a restraining direction, and an unlocking member for moving the restraining member in an unlocking direction, by rotating integrally with the reel and moving according to a chucking operation of rotation means of a drive unit;

wherein the reel has a reel gear which meshes with a driving gear of drive means of the drive unit;

the unlocking member has a main body which abuts the restraining member, and leg portions whose lower ends abut part of the drive means of the drive unit through guide holes provided to penetrate the reel gear; and in the locked state, the lower ends of the leg portions of the unlocking member project from a tooth edge of the reel gear.

In accordance with the present invention, there is provided a third magnetic tape cartridge comprising:

a cartridge case where a single reel with magnetic tape wound thereon is rotatably housed; and reel-rotation restraining means which, when not used, goes to a locked state to restrict rotation of the reel and, when used, goes from the locked state to an unlocked state to allow the rotation; the reel-rotation restraining means having a restraining member for restricting rotation of the reel by moving toward or away from the reel, an urging member for urging the restraining member in a restraining direction, and an unlocking member for moving the restraining member in an unlocking direction, by rotating integrally with the reel and moving according to a chucking operation of rotation means of a drive unit;

wherein the restraining member has a restraining gear which meshes with a locking tooth portion formed in the reel to restrain rotation of the reel, the restraining member being supported by a support portion of the cartridge case so that it is slidable without being rotated; and in the unlocked state, the space between a tooth of the restraining gear and the locking tooth portion is set to a length greater than or equal to a tooth depth of the restraining gear.

In the third magnetic tape cartridge, it is preferable that the aforementioned space be set greater than or equal to 1.2 times the tooth depth of the restraining gear. It is further preferable that the aforementioned space be set greater than or equal to 1.4 times the tooth depth of the restraining gear.

In accordance with the present invention, there is provided a fourth cartridge case where a single reel with magnetic tape wound thereon is rotatably housed; and reel-rotation restraining means which, when not used, goes to a locked state to restrict rotation of the reel and, when used, goes from the locked state to an unlocked state to allow the rotation; the reel-rotation restraining means having a restraining member for restricting rotation of the reel by moving toward or away from the reel, an urging member for urging the restraining member in a restraining direction, and an unlocking member for moving the restraining member in an unlocking direction, by rotating integrally with the reel and moving according to a chucking operation of rotation means of a drive unit;

wherein either a slide portion of the restraining member or a slide portion of the unlocking member is formed into a curved surface which has a radius of curvature of 30 mm or less.

In the fourth magnetic tape cartridge, it is preferable that the radius of curvature of the curved surface be 20 mm or less. It is further preferable that the radius of curvature of the curved surface be 15 mm or less.

In accordance with the present invention, there is provided a fifth magnetic tape cartridge comprising:

a cartridge case where a single reel with magnetic tape wound thereon is rotatably housed; and reel-rotation restraining means which, when not used, goes to a locked state to restrict rotation of the reel and, when used, goes from the locked state to an unlocked state to allow the rotation; the reel-rotation restraining means having a restraining member for restricting rotation of the reel by moving toward or away from the reel, an urging member for urging the restraining member in a restraining direction, and an unlocking member for moving the restraining member in an unlocking direction, by rotating integrally with the reel and moving according to a chucking operation of rotation means of a drive unit;

wherein the restraining member has a restraining gear which meshes with a locking tooth portion formed in the reel to restrain rotation of the reel;

the urging member is supported by a spring receiver formed in the cartridge case; and the following relationship is met:

$$e \leq (2 \times f \times c)/d$$

where "c" represents the space between a tooth of the restraining gear in the unlocked state and the locking tooth portion, "d" represents the outside diameter of the restraining gear, "e" represents the clearance between an outer periphery of the urging member and an inner periphery of the spring receiver, and "f" represents the length of engagement between the urging member and the spring receiver.

To achieve the aforementioned second object of the present invention and in accordance with the present invention, there is provided a sixth magnetic tape cartridge comprising:

a cartridge case where a single reel with magnetic tape wound thereon is rotatably housed; and reel-rotation restraining means which, when not used, goes to a locked state to restrict rotation of the reel and, when used, goes from the locked state to an unlocked state to allow the rotation; the reel-rotation restraining means having a restraining member for restricting rotation of the reel by moving toward or away from the reel, an urging member for urging the restraining member in a restraining direction, and an unlocking member for moving the restraining member in an unlocking direction, by rotating integrally with the reel and moving according to a chucking operation of rotation means of a drive unit;

wherein the restraining member has a restraining gear which meshes with a locking tooth portion formed in the reel to restrain rotation of the reel; and a tooth of the restraining gear has two inclined faces which have an apex angle and interior angles, the apex angle being between an apex angle of the locking tooth portion of the reel and 90 degrees, and the interior angles being 30 degrees or greater with respect to a vertical line and also being approximately the same.

Note that the aforementioned vertical line refers to a line vertical to the direction of rotation of the reel. Also, in the sixth magnetic tape cartridge, it is preferable that the locking tooth portion and the tooth of the restraining gear be formed from synthetic resin material.

The present invention has the following advantages:

(1) In the reel-rotation restraining means, which has a restraining member for restricting rotation of the reel by moving toward or away from the reel, an urging member for urging the restraining member in a restraining direction, and an unlocking member for moving the restraining member in an unlocking direction, by rotating integrally with the reel and moving according to a chucking operation of rotation means of a drive unit, the following relationship is met:

$$b \leq (2 \times a \times c)/d$$

where "a" represents the length of engagement between the restraining member in the unlocked state and the support portion, "b" represents the clearance between the restraining member and the support portion, "c" represents the space between a tooth of the restraining gear and the locking tooth portion, and "d" represents the outside diameter of the restraining gear; or the following relationship is met:

$$e \leq (2 \times f \times c)/d$$

where "c" represents the space between a tooth of the restraining gear in the unlocked state and the locking tooth portion, "d" represents the outside diameter of the restraining gear, "e" represents the clearance between an outer periphery of the urging member and an inner periphery of the spring receiver, and "f" represents the length of engagement between the urging member and the spring receiver. With this arrangement, tilting of the restraining member is suppressed in the unlocked state. Therefore, the contact between the restraining gear and the locking tooth portion can be prevented and the major causes of an undesirable sound and a hindrance to the rotation of the reel can be eliminated.

(2) In the locked state, the lower ends of the leg portions of the unlocking member project from the tooth edge of the reel gear. Also, in the unlocked state, the space between the tooth of the restraining gear and the locking tooth portion is set to a length greater than or equal to the tooth depth of the restraining gear. With this arrangement, the extent of movement of the restraining member in the unlocked state increases. Therefore, even if the restraining member tilts slightly, the contact between the restraining gear and the locking tooth portion can be prevented and the major causes of an undesirable sound and a hindrance to the rotation of the reel can be eliminated.

(3) Either a slide portion of the restraining member or a slide portion of the unlocking member is formed into a curved surface which has a radius of curvature of 30 mm or less. With this, when the restraining member tilts, restoring force to a flat state that equalizes the urging force produced by the urging member in the circumferential direction is enhanced and tilting of the restraining member is suppressed. Therefore, the contact between the restraining gear and the locking protrusion can be prevented and the major causes of an undesirable sound and a hindrance to the rotation of the reel can be eliminated.

(4) The tooth of the restraining gear has two inclined faces which have an apex angle and interior angles, the apex angle being between an apex angle of the locking tooth portion of the reel and 90 degrees, and the interior angles being 30 degrees or greater with respect to a vertical line and also being approximately the same. That is, the interior angles are within 45 degrees. With this, in the meshed state between the restraining gear and the locking tooth portion, the reel can be reliably locked. Even if the two are shifted in phase when locked and therefore the reel is moved in the reverse winding direction, the extent of movement will be slight and therefore the slack of the magnetic tape will also be slight. Also, even if the reel is moved in the winding direction because of the mesh between the two, the extent of movement will be slight and therefore a pulling force that is exerted on the magnetic tape by the movement of the reel 2 will be small. Therefore, the disengagement of the magnetic tape from the tape leader pin due to forced locking can be prevented.

(5) When the reel is rotated in the winding direction by falling shock, etc., and an excessive pulling force is exerted on the magnetic tape, the restraining member is moved in the unlocking direction by the inclined face of the locking tooth portion which faces in the reverse winding direction. As a result, the meshed state between the restraining member and the locking tooth portion becomes shallow and the rotation of the reel in the reverse winding direction is allowed. Therefore, an excessive pulling force can be alleviated and the disengagement of the magnetic tape from the tape leader pin can be prevented.

(6) The apex angle of the tooth of the restraining gear of the restraining member is set to an angle greater than the apex angle of the locking tooth portion of the reel. That is, the tooth edge of the locking tooth portion of the reel is made thinner by setting the apex angle of the locking tooth portion to an angle less than the apex angle of the tooth of the restraining gear of the restraining member. As a result, the locking tooth portion becomes easy to deform, and slight play can be provided between the teeth. Therefore, a force to pull the magnetic tape can be alleviated without reducing the forced locking function. Particularly, in the case where the restraining gear and the locking tooth portion are formed from synthetic resin material, the function of alleviating the pulling force to be exerted on the magnetic force is enhanced because they are easily deformable.

(7) Thus, according to the present invention, reliable locking of the reel in the non-operative state, and alleviation of a magnetic-tape pulling force that is produced in the locked state by falling shock, etc., are compatible with each other. This can enhance reliability, while preventing stretching and disengagement of the magnetic tape and assuring magnetic recording-reproducing characteristics and a correct operation of loading the magnetic tape.

BRIEF DESCRIPTION OF THE DRAWINGS

The present invention will be described in further detail with reference to the accompanying drawings wherein.

DESCRIPTION OF THE PREFERRED EMBODIMENTS

Figure 1:
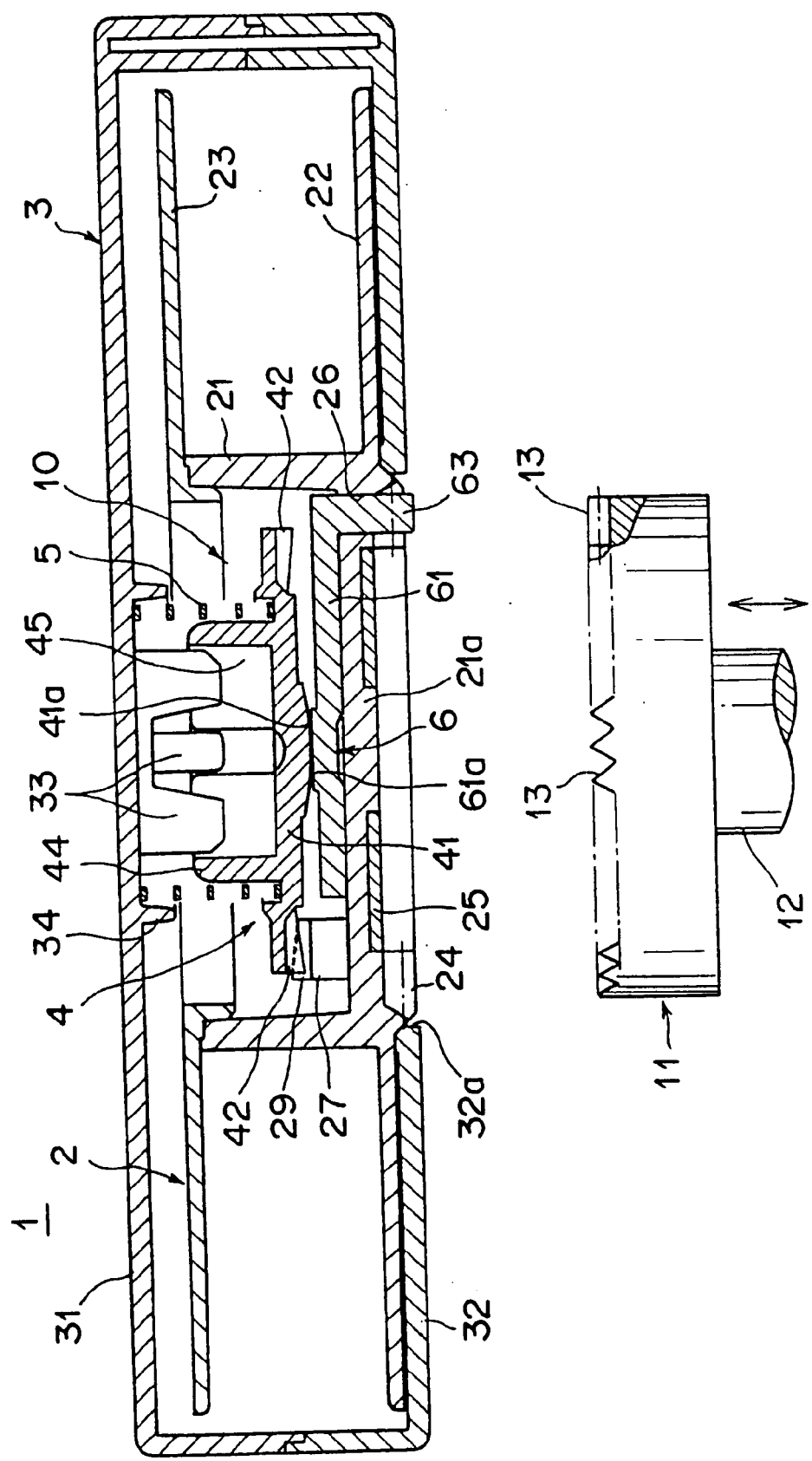
FIG. 1 is a front sectional view of a magnetic tape cartridge of an embodiment of the present invention in the non-operative state.

Referring to FIG. 1, there is shown a preferred embodiment of a magnetic tape cartridge in accordance with the present invention. The magnetic tape cartridge 1 is equipped with a cartridge case 3, which is formed by fastening an upper case 31 and a lower case 32 together with small screws, etc. The lower case 32 is provided at a center portion thereof with an opening 32a. A single reel 2 with magnetic tape (not shown) wound thereon is housed rotatably within the cartridge case 3. The magnetic tape cartridge 1 is further equipped with reel-rotation restraining means 10, which allows rotation of the reel 2 when being used and restricts the rotation when not being used.

The reel 2 consists of a bottomed cylindrical reel hub 21, where magnetic tape is wound on the outer periphery, and upper and lower flange portions 22 and 23 respectively projected in disk form in the radial direction from the upper and lower ends of the outer periphery of this reel hub 21. The reel hub 21 and the lower flange portion 22 are integrally formed from synthetic resin and are united with the upper flange portion 23, for example, by ultrasonic welding. The reel hub 21 is closed at a lower portion thereof by a bottom wall 21a. The radially outer portion of the bottom surface of the bottom wall 21a has an annular reel gear 24 that meshes with the driving gear 13 of rotation means 11 provided in a cartridge drive mechanism (not shown). A reel plate 25 for magnetic suction is formed from an annular metal plate and is attached inside the reel gear 24. The reel gear 24 and reel plate 25 of the reel 2 are disposed to face the opening 32a in the bottom surface of the cartridge case 3. Note that the reel 2 is urged downward by an urging member 5 to be described later.

On the other hand, the rotation means 11 of the cartridge drive mechanism is equipped on the upper end surface of a rotating shaft 12 with the annular driving gear 13 and a driving magnet (not shown). In the chucking operation, the magnetic tape cartridge 1 loaded into a bucket (not shown) on the driving side is lowered toward the rotating shaft 12. Then, the driving gear 13 meshes with the reel gear 24, and the reel plate 25 inside the reel gear 24 is attracted by the driving magnet provided inside the riving gear 13, whereby the meshed state between the driving gear 13 and the reel gear 24 is held.

Next, a description will be given of the mechanism of the reel-rotation restraining means 10. This reel-rotation restraining means 10 is equipped with a restraining member 4 movable toward or away from the reel 2 in an up-and-down direction; an urging member 5, formed from a coil spring, for urging the restraining member 4 in a restraining direction; and an unlocking member 6 for moving the restraining member 4 in an unlocking direction.

Figure 3:
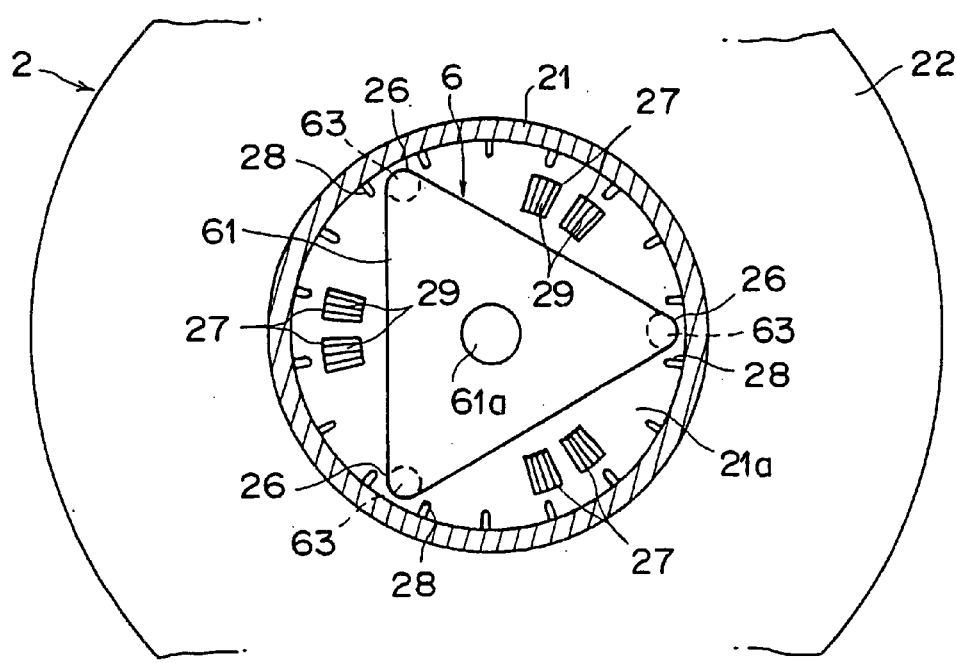
FIG. 3 is a part-sectional view taken substantially along line A—A of FIG. 2.
Figure 4:
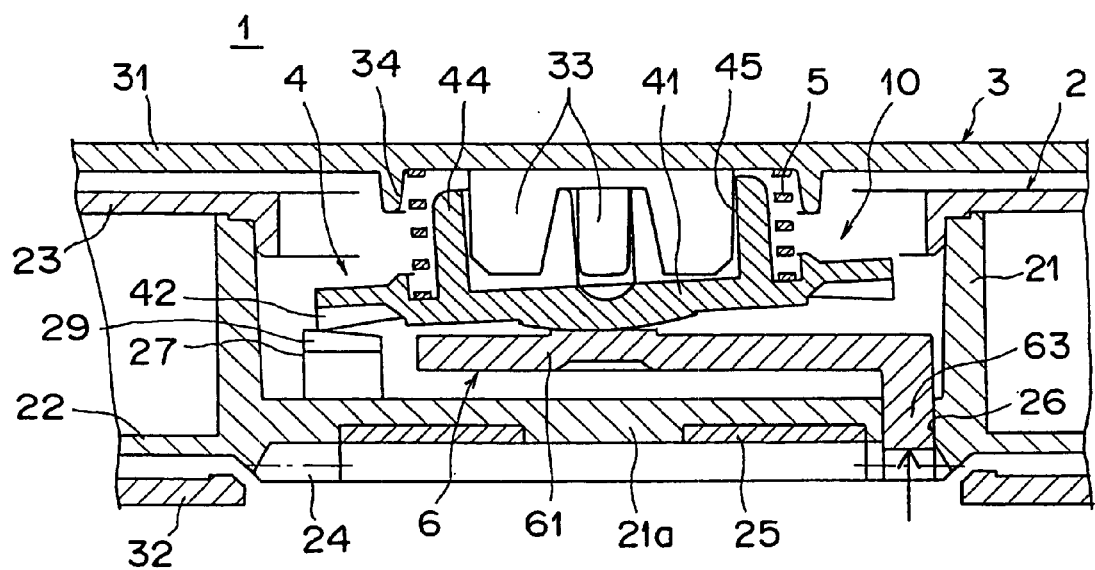
FIG. 4 is a part-sectional view showing the tilted state of the restraining member shown in FIG. 2.

Three guide holes 26 penetrating the reel gear 24 in the up-and-down direction are disposed in the bottom wall 21a of the reel 2 at regular intervals on a circle (see FIG. 4). Furthermore, three pairs of locking protrusions (i.e., 6 locking protrusions) 27 are erected in the top surface of the bottom wall 21a at regular intervals on a circle at positions different in phase from the guide holes 26 (see FIG. 3). The upper end portion of each locking protrusion 27 is formed into a locking tooth portion 29. Note that three or more guide holes 26 may be disposed. Also, three or more pairs of locking protrusions 27 may be disposed. Furthermore, the locking tooth portion 29 of the upper end of the locking protrusion 27 may be constructed of a single tooth.

The restraining member 4, formed from synthetic resin material, has a disc portion 41 within the reel hub 21 of the reel 2. The disc portion 41 is disposed to face the bottom wall 21a of the reel 2. A restraining gear 42 is formed in annular form in the radially outer portion of the bottom surface of the disc portion 41 and is meshable with the locking tooth portion 29 of the locking protrusions 27. In addition, the center portion of the bottom surface of the disc portion 41 is projected downward and formed into a slide portion 41a. The slide portion 41a is engageable with the slide portion 61a of the top surface of the main portion 61 of the unlocking member 6 to be described later by the urging force of the urging member 5 of the reel-rotation restraining means 10.

Furthermore, a protruding portion 44 extends upward from the top surface of the disc portion 41 of the restraining member 4. The protruding portion 44 is provided with a stopper groove 45 in the form of a cross, which extends in the up-and-down direction. On the other hand, a support portion (swivel stopping protrusion) 33 that is inserted into the stopper groove 45 is erected in the inside surface of the upper case 31 of the cartridge case 3. If the stopper groove 45 and the support portion 33 are engaged with each other, the restraining member 4 can move in the up-and-down direction without rotating. While the support portion 33 in this embodiment is provided inside the restraining member 4, it may be provided outside the restraining member 4.

The urging member (e.g., a coil spring) 5 is interposed between the top surface, outside the protruding portion 44, of the disc portion 41 of the restraining member 4 and the inside surface, outside the support portion 33, of the upper case 3. The urging member 5 is used for urging the restraining member 4 downward in the locking direction where the restraining gear 42 and the locking tooth portion 29 engage with each other.

The unlocking member 6 is interposed between the restraining member 4 and the bottom wall 21a of the reel hub 21 so that it is movable up and down. For this reason, three cylindrical leg portions 63 extending in the up-and-down direction are provided on the bottom surface of the triangular main body 61 corresponding to the vertexes of the main body 61. The leg portions 63 are inserted into the guide holes 26 of the bottom wall 21 of the reel 2 so that they are movable into and out of the guide holes 26. The lower ends of the leg portions 63 are located to face the tooth portion of the reel gear 24 of the bottom surface of the reel 2. With the leg portions 63 inserted into the guide holes 26, each pair of locking protrusions 27 is located between two adjacent leg portions 63 and outside the main body 61 of the unlocking member 6. Note that the leg portion 63 may be formed into the shape of a square pillar, an elliptic cylinder, etc.

When the unlocking member 6 is at the lowest position (see FIG. 1), the lower ends of the leg portions 63 of the unlocking member 6 project from the reel gear 24. When, at the lowest position, the driving gear 13 is meshed with the reel gear 24 by the chucking operation of the rotation means 11 of the cartridge drive mechanism (not shown), the unlocking member 6 is pushed upward by a predetermined quantity of stroke (see FIG. 2). Also, the unlocking member 6 is rotated integrally with the reel 2 by the fit of the leg portions 63 into the guide holes 26.

The reel 2 is provided with guide members 28 for guiding part of the unlocking member 6 in the direction of insertion when inserting the leg portions 63 of the unlocking member 6 into the guide holes 26 (see FIG. 3). Each guide member 28 is formed on the inside wall, near the guide hole 26, of the reel hub 21 of the reel 2 and is constructed of two guide ribs, which extend in the up-and-down direction (i.e., the direction in which the leg portions 63 are inserted), for guiding the vertex of the triangular main body 61 of the unlocking member 6. Also, similar reinforcement ribs are disposed over the inner peripheral surface of the reel hub 21.

In the unlocked state of the reel-rotation restraining means 10, incidentally, the restraining member 4 is unstable and tends to tilt, because only the central portion of the bottom surface of the restraining member 4 is in contact with the central portion of the unlocking member 6. On the other hand, since the reel 2 is rotated or stopped when magnetic tape is loaded or unloaded, the force produced by the loading or unloading operation is exerted on the restraining member 4 through the unlocking member 6. Therefore, if the restraining member 4 is tilted as shown in FIG. 4 by the produced force, the restraining gear 42 of the restraining member 4 will be brought into contact with the locking tooth portion 29 of the reel 2 and will produce an undesirable sound. Because of this, rotation of the reel 2 is disturbed and the operation of loading or unloading magnetic tape cannot be performed with stability.

Figure 5:
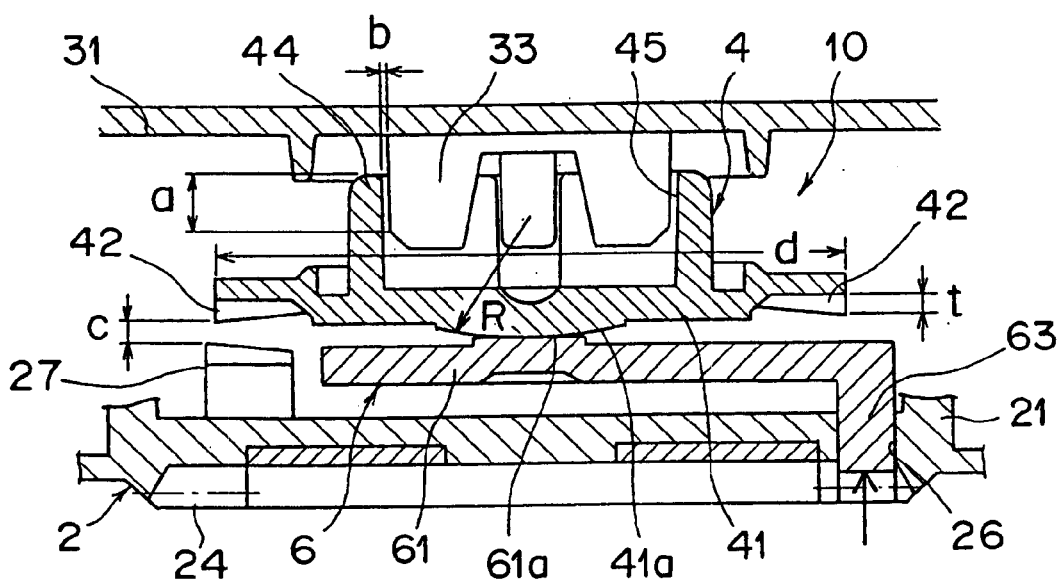
FIG. 5 is a part-sectional view showing the positional relationships between parts, obtained according to a form for suppressing the tilt of the restraining member.

Hence, in the present invention, a structure for suppressing the tilt of the restraining member 4 that is in the unlocked state is adopted in the reel-rotation restraining means 10. As a first form of the tilt suppressing structure, in a stopper structure, which is constructed of the stopper groove 45 of the protruding portion 44 and the support portion 33 of the upper case 31, for supporting the restraining member 4 on the upper case 31 so that it is movable in the up-and-down direction without rotating, as shown in FIG. 5, the following dimensional relationship is met:

$$b \leq (2 \times a \times c)/d$$

where "a" represents the length of engagement between the restraining member 4 and the support portion 33 of the upper case 31, "b" represents the clearance between the restraining member 4 and the support portion 33, "c" represents the space between the restraining gear 42 and the locking tooth portion 29 of the locking protrusion 27, and "d" represents the outside diameter of the restraining gear 42.

That is, the clearance b between the restraining member 4 and the support portion 33 is set narrow to the degree that contact between the restraining gear 42 and the locking tooth portion 29 does not occur.

From the aforementioned Equation, the length of engagement between the restraining member 4 and the upper case is set long so that it meets the following dimensional relationship:

$$a \geq (b \times d)/(2 \times c).$$

Figure 6:
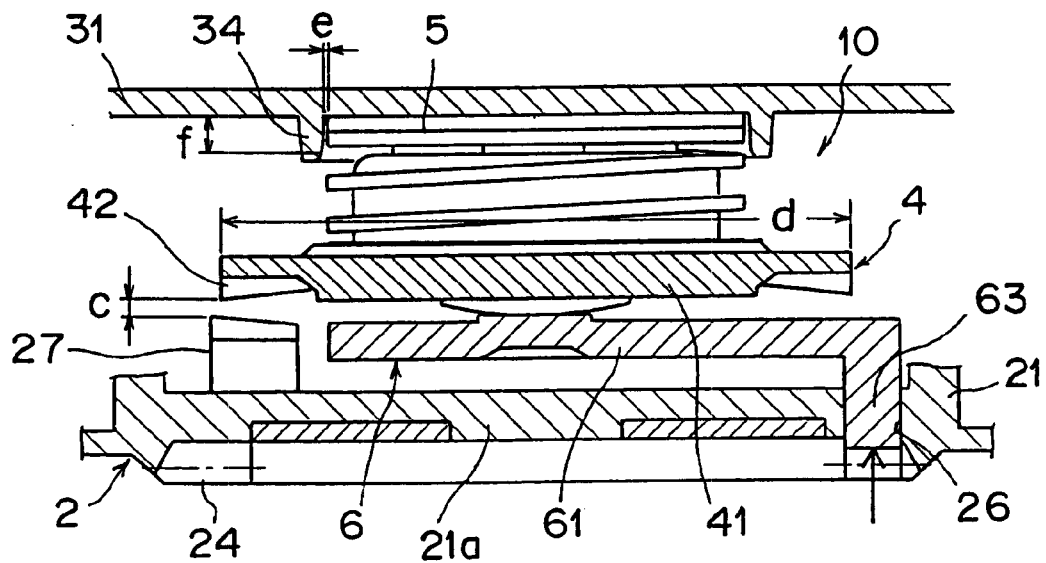
FIG. 6 is a part-sectional view showing the positional relationships between parts, obtained according to another form for suppressing the tilt of the restraining member.

As a second form of the tilt suppressing structure, in the case of providing the urging member 5 formed from a coil spring, as shown in FIG. 6, the following dimensional relationship is set in order to suppress the tilt of the restraining member 4 by regulating the tilt of the urging member 5 with respect to a spring receiver 34 formed on the inside surface of the upper case 31:

$$e \leq (2 \times f \times c)/d$$

where "c" represents the space in the unlocked state between the restraining gear 42 and the locking tooth portion 29, "d" represents the outside diameter of the restraining gear 42, "e" represents the clearance between the outer periphery of the urging member 5 and the inner periphery of the spring receiver 34, and "f" represents the length of engagement between the urging member 5 and the spring receiver 34.

That is, the clearance "e" between the restraining member 4 and the support portion 33 is set narrow to the degree that the contact between the restraining gear 42 and the locking tooth portion 29 does not occur. The urging force of the urging member 5 in the circumferential direction is equalized, so the restraining member 4 can be held parallel. Also, the engagement length "f" between the urging member 5 and the spring receiver 34 is made long so that it meets the aforementioned Equation.

As a third form of the tilt suppressing structure, the slide portion 41a of the restraining member 4 that slides on the slide portion 61a of the unlocking member 6 has a curved surface, which has a radius of curvature (R) of 30 mm or less. It is preferable that the radius of curvature (R) be 20 mm or less and further preferable that it be 15 mm or less. With this, the restraining member 4 is liable to return to a flat state if the radius of curvature is smaller, when the restraining member 4 returns to the flat state by oscillation of the slide portion 41a caused when the circumferential urging force produced by the urging member 5 becomes unequal because of the tilt of the restraining member 4.

As a fourth form of the tilt suppressing structure, the lower end of the leg portion 63 of the unlocking member 6 in the locked state is provided to project from the lower end (addendum circle) of the reel gear 24, because the space between the restraining gear 42 and the locking tooth portion 29 becomes large and the allowable tilt angle of the restraining member 4 can be made large, if the quantity of movement of the unlocking member 6 is increased when the unlocking operation is performed (see FIG. 1). With this arrangement, when the driving gear 13 meshes with the reel gear 24, the leg portions 63 of the unlocking member 6 are pushed up before the driving gear 13 meshes with the reel gear 24. For this reason, the extent to which the leg portions 63 are pushed up until the driving gear 13 completely meshes with the reel gear 24, that is, the extent of movement of the unlocking member 6 becomes large. Therefore, the space between the restraining gear 42 and the locking protrusion 27 becomes large in the unlocked state.

As a fifth form of the tilt suppressing structure, in order to similarly make the space between the restraining gear 42 and the locking protrusion 27 larger in the unlocked state, the slide portion 41a of the restraining member 4 and the slide portion 61a of the unlocking member 6 are provided so that they contact each other in the locked state shown in FIG. 1. That is, the restraining member 4 at the lowered position (locked state) does not always need to abut the unlocking member 6, because the restraining gear 42 meshes with the locking tooth portion 29 and is stopped. However, if there is clearance between the restraining member 4 and the unlocking member 6 when the unlocking member 6 moves in the unlocking direction, the quantity of movement of the restraining member 4 is reduced by the quantity of the clearance with respect to the quantity of movement of the unlocking member 6. Therefore, if the restraining member 4 and the unlocking member 6 are in contact with each other in the locked state, the gap between the restraining gear 42 and the locking tooth portion 29 can be made larger in the unlocked state, while assuring the extent of movement of the restraining member 4.

As a sixth form of the tilt suppressing structure, in order to make the gap between the restraining gear 42 and the locking tooth portion 29 larger in the unlocked state even if the extent of movement of the restraining member 4 during the unlocking operation is the same, the space "c" between the restraining gear 42 and the locking tooth portion 29 is set greater than or equal to the whole depth "t" of the restraining gear 42 (see FIG. 5). That is, the relationship between c and t is set to c≧t. It is preferable that the relationship be c≧1.2t and further preferable that it be c≧1.4t. If teeth are the same in shape, increasing the number of teeth of the restraining gear 42 can reduce the whole tooth depth "t" and make the aforementioned space "c" larger. Therefore, when the restraining member 4 tilts slightly, the contact between the restraining gear 42 and the locking tooth portion 29 can be prevented. In addition, a reduction in the pitch between adjacent teeth in the restraining gear 42 reduces slackening or stretching of magnetic tape in the locked state.

Note that practically, the aforementioned various tilt suppressing forms are constructed in combination so that the tilt of the restraining member 4 is prevented.

Furthermore, in the present invention, the reel-rotation restraining means adopts a structure for preventing the disengagement of the magnetic tape from a tape leader pin which is caused by the magnetic tape pulled in the locked state by falling shock, etc.

Figure 7:
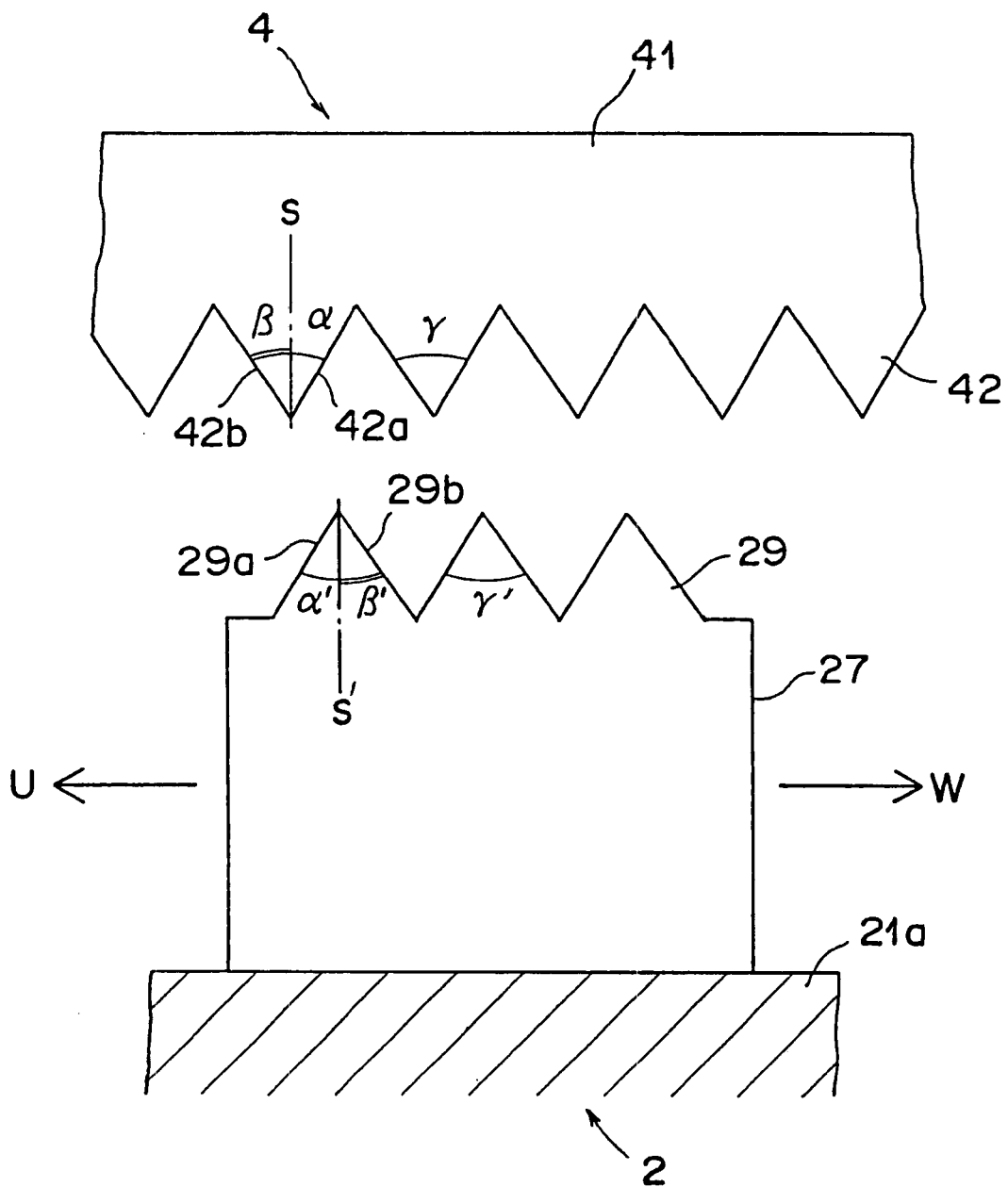
FIG. 7 is an enlarged sectional view taken substantially along line B—B of FIG. 2.

The restraining gear 42 of the restraining member 4 and the locking tooth portion 29 have a triangular cross section, as illustrated in FIG. 7. Each tooth of the locking tooth portion 29 on the side of the reel 2 has a front inclined face 29b which faces in the winding direction (indicated by an arrow W) and a rear inclined face 29a which faces in the reverse winding direction (indicated by an arrow U). On the other hand, each tooth of the restraining gear 42 on the restraining member 4 has a front inclined face 42a which abuts the rear inclined face 29a of the locking tooth portion 29 when the reel 2 is rotated in the reverse winding direction (indicated by an arrow U), and a rear inclined face 42b which abuts the front inclined face 29b when the reel 2 is rotated in the winding direction (indicated by an arrow W).

In the tooth of the restraining gear 42, the apex angle γ is within 90 degrees, the interior angle α of the front inclined face 42a with respect to a vertical plane "s" is 30 degrees or greater, the interior angle β of the rear inclined face 42a with respect to the vertical plane "s" is 30 degrees or greater, and α and β are approximately the same. In the tooth of the locking tooth portion 29, as with the tooth of the restraining gear 42, the apex angle γ' is within 90 degrees, the interior angle α' of the rear inclined face 29a with respect to a vertical plane s' is 30 degrees or greater, the interior angle β' of the front inclined face 29a with respect to the vertical plane s' is 30 degrees or greater, and α' and β' are approximately the same. However, γ is greater than or equal to γ'. That is, the restraining gear 42 and the locking tooth portion 29 are formed in a range of 60°≦γ'≦γ≦90° and 30°≦α, β, α', β'≦45°.

Note that the restraining gear 42 and the locking tooth portion 29 are formed in conical form so that the whole tooth depth of the outer peripheral portion becomes higher. Thus, the outer peripheral portions mesh each other earlier.

Now, a description will be given of the operation of the reel-rotation restraining means 10. In a non-operative state, such as an archived state, etc., of the magnetic tape cartridge 1 shown in FIG. 1, the restraining member 4, the unlocking member 6, and the reel 2 are moved to the side of the lower case 32 of the cartridge case 3 by the urging force of the urging member 5. The center opening 32a in the lower case 32 is closed by the reel 2. The unlocking member 6 is at the lowered position where the bottom surface abuts the top surface of the bottom wall 21a of the reel hub 21. The lower ends of the leg portions 63 of the unlocking member 6 project from the tooth edge of the reel gear 24. The restraining member 4 abutting the top surface of the unlocking member 6 is also at its lowered position. The locking tooth portion 29 of the reel 2 mesh with the restraining gear 42 of the restraining member 4. Thus, the restraining member 4 restricts rotation of the reel 2 and is in a locked state of preventing the operation of loading the magnetic tape.

Figure 2:
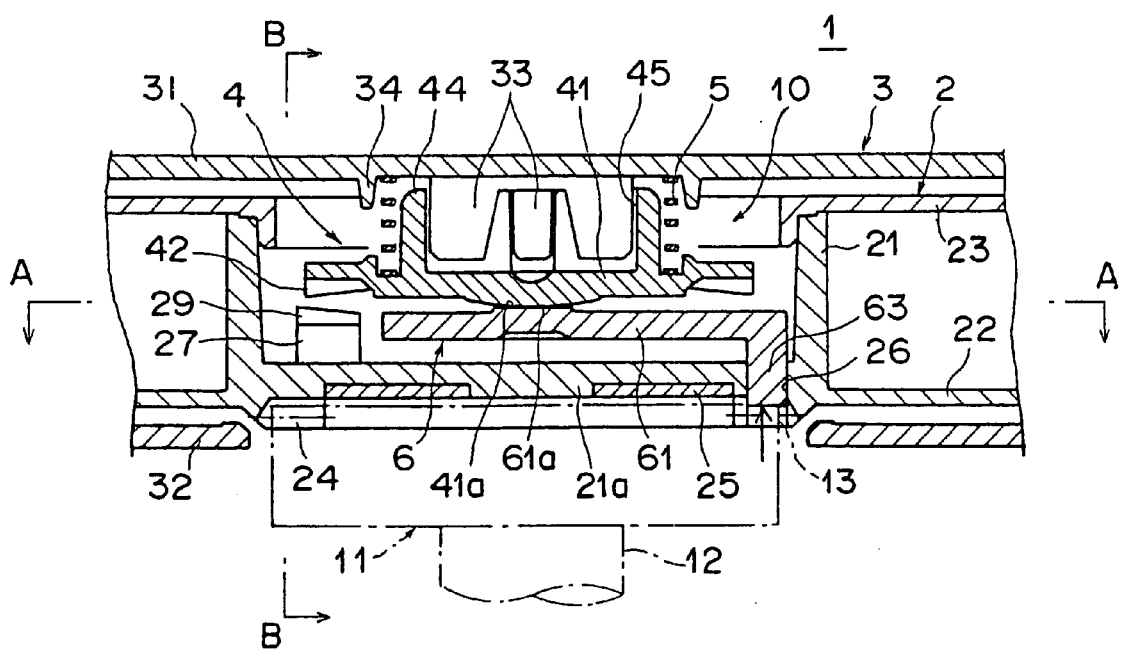
FIG. 2 is a part-sectional view of the essential parts of the magnetic tape cartridge of FIG. 1 in the operative state.

On the other hand, in the operative state of FIG. 2 in which the magnetic tape cartridge 1 is loaded into the drive mechanism of the recording-reproducing unit, the rotating shaft 12 of the rotation means 11 approaches the bottom surface of the reel 2. Also, the driving gear 13 meshes with the reel gear 24 and moves and holds the reel 2 slightly upward. Then, the tooth edges of the driving gear 13 abut the lower ends of the leg portions 63 of the unlocking member 6 and push them up. As a result, the unlocking member 6 moves upward against the urging force of the urging member 5, and the restraining member 4, along with this unlocking member 6, also moves in the upward unlocking direction. This unlocks the engagement between the teeth of the restraining gear 42 and the locking tooth portion 29, whereby the reel 2 becomes free to rotate. In this unlocked state, the magnetic tape is loaded or unloaded by the drive mechanism of the recording-reproducing unit.

In the locked state, the tilt of the restraining member 4 is suppressed or removed by adopting the aforementioned various forms of the tilt suppressing structure. Also, the gap between the restraining gear 42 and the locking tooth portion 29 is made larger in the unlocked state. Therefore, the contact between the restraining gear 42 and the locking tooth portion 29 is prevented, the occurrence of an undesirable sound is prevented, and a hindrance to rotation of the reel 2 is prevented. In this manner, the magnetic tape can be rotated without being subjected to a load of some magnitude.

In addition, since the interior angels $\alpha$ and $\beta$ of the inclined faces of each tooth of the restraining gear 42 and the interior angles $\alpha'$ and $\beta'$ of each tooth of the locking tooth portion 29 is set between 30 and 45 degrees, the reel 2 can be reliably locked in the meshed state between the restraining gear 42 and the locking tooth portion 29. Furthermore, even if the restraining gear 42 and the locking tooth portion 29 are shifted in phase from each other when they are locked, the extent of movement due to the mesh between the restraining gear 42 and the locking tooth portion 29 will be slight in the reverse winding direction and the winding direction. The slack of the magnetic tape is also slight, so a pulling force that is exerted on the magnetic tape by the movement of the reel 2 in the winding direction W is small. Therefore, the disengagement of the magnetic tape from a tape leader pin due to forced locking can be prevented.

When, in the aforementioned locked state, the reel 2 is rotated in the winding direction W by falling shock, etc., and an excessive pulling force is exerted on the magnetic tape, the restraining member 4 is moved upward in the unlocking direction against the urging member 5 by the inclined faces 42a and 29a of the restraining gear 42 and the locking tooth portion 29 which face in the reverse winding direction U, because the interior angles of the inclined surface 42a and 29a are 30 degrees or greater. With the upward movement of the restraining member 4, the restraining gear 42 and the locking tooth portion 29 are disengaged from each other and the reel 2 is rotated in the reverse winding direction U, that is, the tape slackening direction, so pulling force is reduced and alleviated. Thus, stretching and disengagement of the magnetic tape can be prevented.

While the present invention has been described with reference to the preferred embodiments thereof, the invention is not to be limited to the details given herein, but may be modified within the scope of the invention hereinafter claimed.

What is claimed is:

1. A magnetic tape cartridge comprising:

a cartridge case where a single reel with magnetic tape wound thereon is rotatably housed; and reel-rotation restraining means which, when not used, goes to a locked state to restrict rotation of said reel and, when used, goes from said locked state to an unlocked state to allow said rotation; said reel-rotation restraining means having a restraining member for restricting rotation of said reel by moving toward or away from said reel, an urging member for urging said restraining member in a restraining direction, and an unlocking member for moving said restraining member in an unlocking direction, by rotating integrally with said reel and moving according to a chucking operation of rotation means of a drive unit;

wherein said restraining member has a restraining gear which meshes with a locking tooth portion formed in said reel to restrain rotation of said reel; and a tooth of said restraining gear has two inclined faces which have an apex angle and interior angles, said apex angle being between an apex angle of the locking tooth portion of said reel and 90 degrees, and said interior angles being 30 degrees or greater with respect to a vertical line and also being approximately the same.

2. The magnetic tape cartridge as set forth in claim 1, wherein said locking tooth portion and the tooth of said restraining gear are formed from synthetic resin material.

* * * * *